United States Patent [19]
Hyde

[11] Patent Number: 5,894,382
[45] Date of Patent: Apr. 13, 1999

[54] HEAD STACK ASSEMBLY FOR A DISK DRIVE HAVING A PLASTIC INNER SLEEVE

[75] Inventor: Darryl L. Hyde, San Jose, Calif.

[73] Assignee: Western Digital Corporation, Irvine, Calif.

[21] Appl. No.: 09/002,644

[22] Filed: Jan. 5, 1998

[51] Int. Cl.[6] .............................. G11B 5/54; G11B 21/08
[52] U.S. Cl. ......................................................... 360/106
[58] Field of Search ................................................. 360/106

[56] References Cited

U.S. PATENT DOCUMENTS 5,621,590  4/1997  Pace et al. ............................. 360/106
5,818,665  10/1998  Malagrino, Jr. et al. ............... 360/106

*Primary Examiner*—Robert S. Tupper
*Attorney, Agent, or Firm*—Leo J. Young; W. Chris Kim; Milad Shara

[57] ABSTRACT

A magnetic disk drive with a head stack assembly includes a body portion, a coil portion cantilevered from one side of the body portion, and an actuator arm cantilevered to the opposite side of the body portion, wherein the body portion includes a plastic inner sleeve to provide a quick, press-fit connection with a pivot bearing cartridge. The body portion further includes a non-plastic outer portion which is preferably part of an aluminum E-block having integrally formed actuator arms. The plastic inner sleeve and non-plastic outer portion preferably include a spline and a recess, respectively, that are firmly compressed together by the press-fit connection to prevent relative angular motion. The plastic inner sleeve preferably includes a flat that is aligned with the spline and recess in order to contact the pivot cartridge along the flat and thereby ensure that the press-fit forces are focused onto the spline and recess. The preferred head stack assembly further includes a molding port at a rear portion of the non-plastic outer portion so that the plastic inner sleeve and a plastic overmold of the coil portion may be simultaneously formed and interconnected via the molding port, the molding port and plastic interconnection serving to prevent relative longitudinal motion.

33 Claims, 4 Drawing Sheets

HEAD STACK ASSEMBLY FOR A DISK DRIVE HAVING A PLASTIC INNER SLEEVE

BACKGROUND OF THE INVENTION

1. Field of the Invention

The present invention relates to a disk drive and more particularly to a magnetic disk drive having a head stack assembly with a plastic inner sleeve.

2. Description of the Prior Art and Related Information

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head towards the disk; and (3) a flex cable assembly that provides an electrical interconnect with minimal constraint on movement.

The industry presently prefers a "rotary" or "swing-type" actuator assembly which conventionally comprises a body portion that rotates on a pivot bearing cartridge between limited positions, a coil portion that extends from one side of the body portion to interact with one or more permanent magnets to form a voice coil motor, and an actuator arm that extends from an opposite side of the body portion to support the HGA.

A typical HGA includes a load beam, a gimbal attached to an end of the load beam, and a head attached to the gimbal. The load beam has a spring function which provides a "gram load" biasing force and a hinge function which permits the head to follow the surface contour of the spinning disk. The load beam has an actuator end that connects to the actuator arm and a gimbal end that connects to the gimbal which carries the head and transmits the gram load biasing force to the head to "load" the head against the disk. A rapidly spinning disk develops a laminar air flow above its surface that lifts the head away from the disk in opposition to the gram load biasing force. The head is said to be "flying" over the disk when in this state.

Early head stack assemblies typically included an all metal "E-block" which included an all metal body portion and metal actuator arms that were formed from a single block of metal, e.g. aluminum. A metal pivot bearing cartridge was installed in the bore of the HSA via a side-pull screw. Such E-blocks provided consistent grounding of the actuator arms and unitary movement of the actuator arms such that relative radial movement between the arms, due to, for example temperature changes, was insignificant.

Later head stack assemblies, often called "hybrid" HSAs, were typically formed by overmolding a plastic body portion over several individual metal actuator arms. Hybrid HSAs were an improvement over the E-block HSAs from an assembly point of view because the plastic body portion allowed metal pivot bearing cartridges to be press-fit into the bore of the plastic body portion. Such press-fitting reduced the cost of assembling the components since screws and the associated threaded openings in the pivot bearing cartridge and the body portion were eliminated. Also, particulates due to inserting the screw into the associated threaded openings were not generated and press-fitting the pivot bearing cartridge into the bore was quicker which reduced assembly time of the components.

In hybrid HSAs, a vertical ground pin was needed to connect the individual actuator arms to one another within the plastic body portion to provide grounding to the actuator arms. Hybrid HSAs, however, were subject to inconsistent grounding because of inadequate contact between the ground pin and the actuator arms after the ground pin was inserted in respective holes in the arms. Moreover, thermal relaxation of the plastic body portion could cause the metal actuator arms to move out of radial alignment relative to one another such as during drive operation when significant temperature changes occurred within the disk drive.

SUMMARY OF INVENTION

This invention can be regarded as a head stack assembly for a disk drive, the head stack assembly comprising a body portion, an actuator arm cantilevered from the body portion, and a coil portion cantilevered from the body portion in an opposite direction from the actuator arm. The body portion includes a plastic inner sleeve and a non-plastic outer portion. The plastic inner sleeve includes an inner sleeve surface defining a bore having a longitudinal bore axis and includes a plurality of circumferentially positioned flats, each flat extending in the direction of the longitudinal bore axis. The plastic inner sleeve and the outer portion define holding means for holding in place the plastic sleeve. The holding means includes means for preventing relative angular motion between the plastic inner sleeve and the outer portion.

This invention can also be regarded as a disk drive comprising a base, a cover attached to the base, a spindle motor attached to the base, a disk mounted on the spindle motor, a head stack assembly, and a pivot bearing cartridge. The pivot bearing cartridge includes an outer surface and a shaft, the shaft having an attachment portion for connecting the shaft to the base. The head stack assembly comprises a body portion, an actuator arm cantilevered from the body portion, and a coil portion cantilevered from the body portion in an opposite direction from the actuator arm. The body portion includes a plastic inner sleeve and a non-plastic outer portion. The plastic inner sleeve includes an inner sleeve surface defining a bore having a longitudinal bore axis and includes a plurality of circumferentially positioned flats, each flat extending in the direction of the longitudinal bore axis. The plastic inner sleeve and the outer portion define holding means for holding in place the plastic sleeve. The holding means includes means for preventing relative angular motion between the plastic inner sleeve and the outer portion. The plastic inner sleeve of the head stack assembly surrounds the pivot bearing cartridge.

DETAILED DESCRIPTION OF THE PREFERRED EMBODIMENTS

Figure 1:
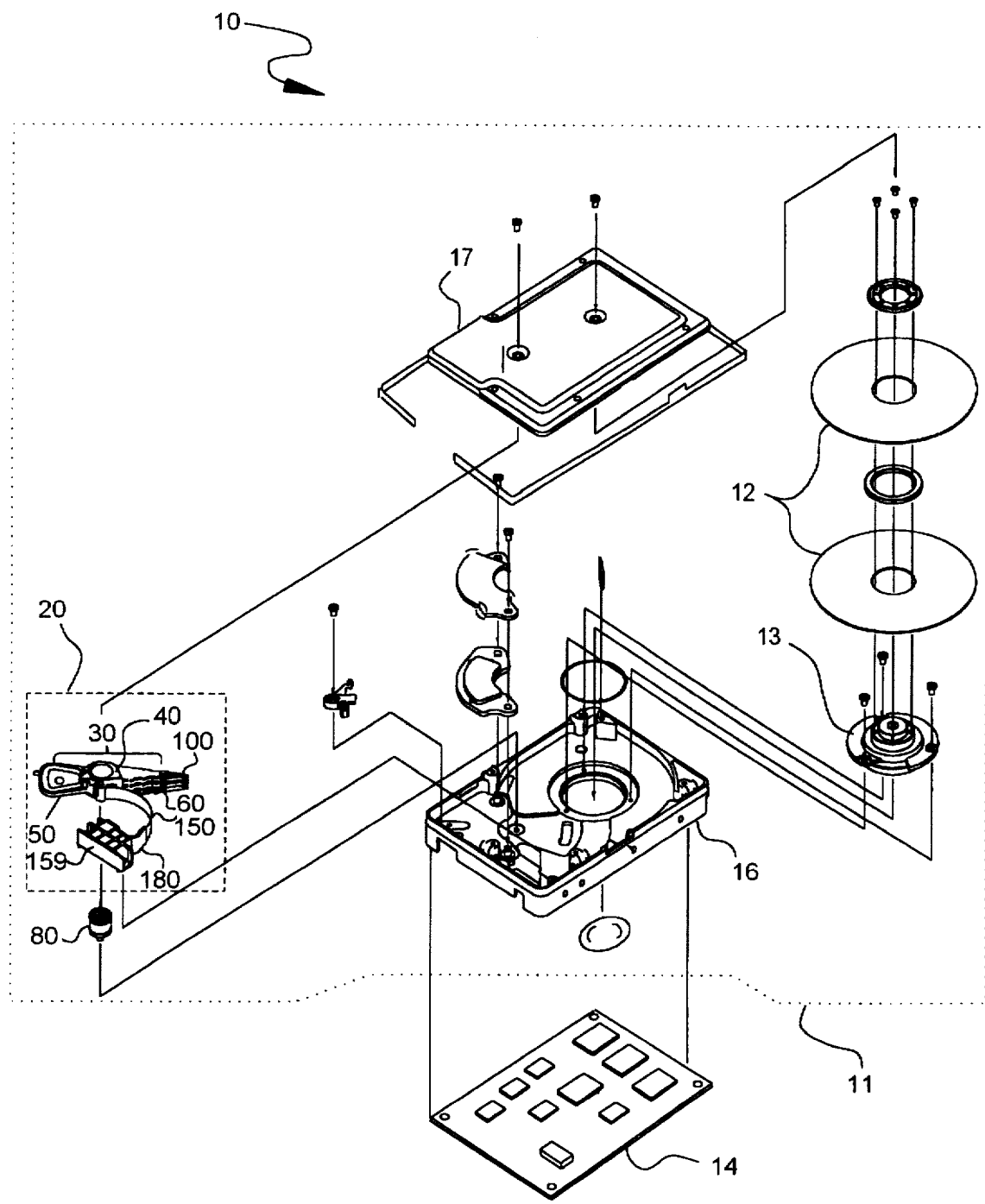
FIG. 1 is an exploded perspective view of a magnetic hard disk drive including a head stack assembly with a plastic inner sleeve according to an embodiment of the present invention.

FIG. 1 shows the principal components of a disk drive such as a magnetic hard disk drive 10 constructed in accordance with this invention. With reference to FIG. 1, the preferred disk drive 10 is an integrated drive electronics (IDE) drive comprising an HDA 11 and a PCBA 14.

The HDA 11 includes a base 16 and a cover 17 attached to the base that collectively house a magnetic disk 12 (two shown), a spindle motor 13 attached to the base for rotating the mounted disk 12, a head stack assembly 20, and a pivot bearing cartridge 80, such as a stainless steel pivot bearing cartridge, that rotatably supports the HSA 20 on the base 16. Preferably, the spindle motor 13 rotates the disk 12 at a constant angular velocity. The preferred head stack assembly 20 comprises a swing-type or rotary actuator assembly 30, at least one head gimbal assembly 100, and a flex circuit cable assembly 180. The rotary actuator assembly 30 includes a body portion 40, an actuator arm 60 cantilevered from the body portion 40, and a coil portion 50 cantilevered from the body portion 40 in an opposite direction from the actuator arm 60. The actuator arm 60 supports the head gimbal assembly 100 with a head located at its far end biased towards and moveable over the disk 12. The flex cable assembly 180 includes a flex circuit cable 150 and a flex clamp 159. The head stack assembly 20 is pivotally secured to the base 16 via the pivot bearing cartridge 80 so that the head at the end of the head gimbal assembly 100 may be moved over a recording surface of the disk 12.

The HDA's storage capacity may be increased, as shown in FIG. 1, by including several disks 12 and a head stack assembly 20 having a vertical "stack" of head gimbal assemblies 100 supported by multiple actuator arms 60.

Figure 2:
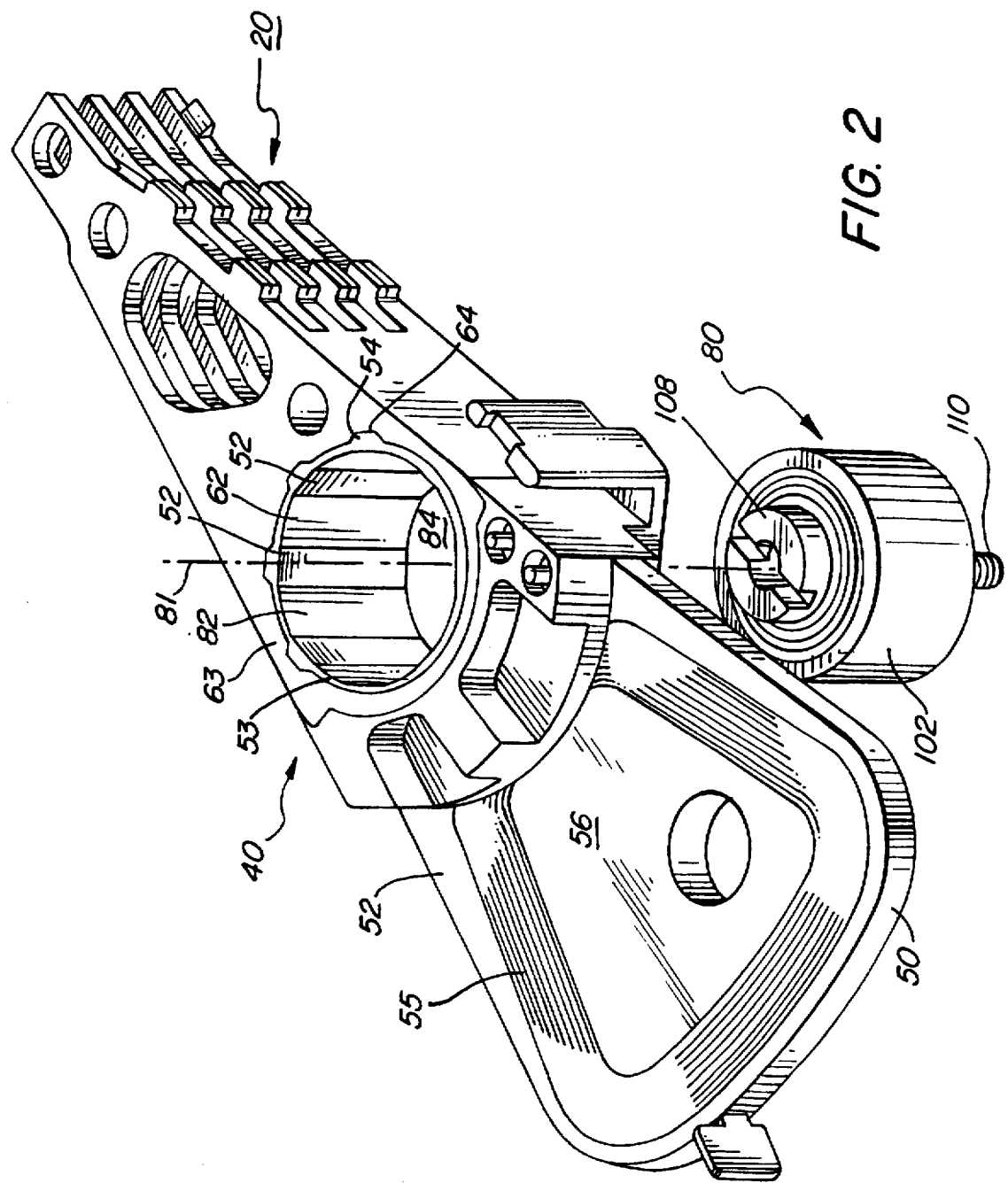
FIG. 2 is a perspective view of a portion of the head stack assembly of FIG. 1, showing the assembly relationship between the plastic inner sleeve and a pivot cartridge.

FIG. 2 shows the HSA 20 of FIG. 1 (with the HGAs and the flex circuit cable assembly removed for clarity), along with the pivot bearing cartridge 80 that pivotally attaches the HSA 20 to the base. Pivot bearing cartridge 80 includes an outer surface 102 and a shaft 108. Shaft 108 includes an attachment portion 110 for connecting the shaft to the base of the disk drive. When pivot bearing cartridge is pressed into the bore, outer surface 102 contacts respective portions of a plastic inner sleeve 53 such that plastic inner sleeve 53 surrounds pivot bearing cartridge 80. Alternatively, outer surface 102 may include an upper band surface and a lower band surface (not shown) where the band surfaces are separated by a gap; each band surface contacts respective portions of a plastic inner sleeve 53 when the pivot bearing cartridge is pressed into the bore.

Figure 3:
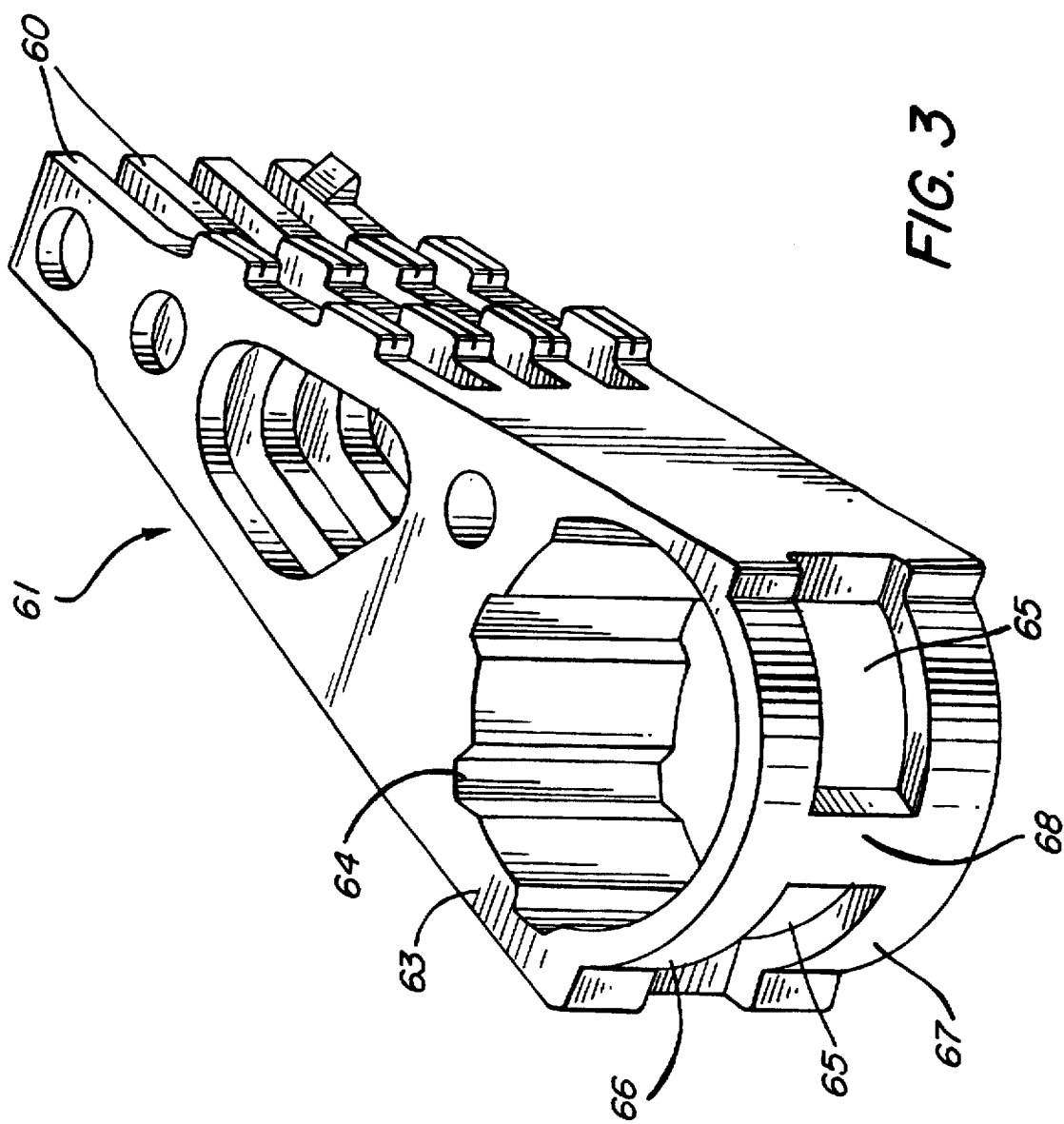
FIG. 3 is a perspective view of the head stack assembly portion of FIG. 2 without the plastic inner sleeve or coil portion.

As shown, the HSA's body portion 40 includes the plastic inner sleeve 53 and a non-plastic outer portion 63. Outer portion 63 is preferably metal, such as aluminum, and includes a plurality of recesses 64 and a plurality of molding ports 65 (FIG. 3). Alternatively, outer portion 63 may be formed from another non-plastic material such as ceramic. The plastic inner sleeve 53 includes an inner sleeve surface 82 which defines a bore 84 having a longitudinal bore axis 81 to form a press fit connection with the pivot bearing cartridge 80. Plastic inner sleeve 53 further includes a plurality of splines 54 which are circumferentially positioned; preferably, four splines are used spaced at equal intervals. Inner sleeve surface 82 includes a plurality of circumferentially positioned flats 52 such that each flat extends in the direction of bore axis 81 and is for contacting a respective portion of outer surface 102 of pivot bearing cartridge 80.

While FIG. 2 shows that each flat 52 extends along the entire length of inner sleeve surface 82, other types of flat configurations are possible such as having a set of flats wherein within the set, any given pair of longitudinally spaced-apart flats are separated by a gap (not shown). For example, the set of flats could include a first flat which contacts a respective portion of pivot bearing cartridge 80 and a second flat, longitudinally spaced-apart from the first flat, which contacts another respective portion of the pivot bearing cartridge; in this instance, the first and second flats may be separated by a cavity defined by inner sleeve surface 82. Preferably, each flat 52 is separated circumferentially by an arc 62 such that when pivot bearing cartridge 80 is press-fitted into bore 84, an air gap exists between the pivot bearing cartridge and the arc. Preferably, the arcs and the flats are spaced at equal intervals.

The plastic inner sleeve 53 is desirable because it permits the pivot bearing cartridge 80 to be quickly inserted into the HSA 20 during manufacture. While providing for a press-fit connection, however, the plastic inner sleeve 53 has a different rate of thermal expansion relative to the non-plastic outer portion 63.

Continuing with FIG. 2, plastic inner sleeve 53 and outer portion 63 define holding means for holding in place the plastic sleeve, the holding means including means for preventing relative angular motion between the plastic inner sleeve and the outer portion and means for preventing relative longitudinal motion between the plastic inner sleeve and the outer portion. The means for preventing relative angular motion ("angular motion prevention means") in the embodiment of FIG. 2 includes splines 54 positioned within recesses 64 such that the plastic inner sleeve does not rotate relative to the outer portion. In an alternative embodiment, the angular motion prevention means includes splines formed in outer portion 63 and corresponding recesses formed in plastic inner sleeve 53. There are preferably four splines 54 and four recesses 64, but there could be more or less than four. The means for preventing relative longitudinal motion ("longitudinal motion prevention means") in the embodiment of FIG. 2 includes molding ports 65 (FIG. 3) and the plastic portion which "fills" the molding ports when the plastic inner sleeve is formed such that plastic inner sleeve 53 does not move longitudinally relative to outer portion 63.

As shown FIG. 2, each flat 52 extends into the bore and enhances the press fit connection with the pivot bearing cartridge 80 and is strategically aligned to compress a respective spline 54 directly into a respective recess 64 when the pivot bearing cartridge 80 is pressed into the bore. The focused compression of each spline 54 into each recess 64 after pivot bearing cartridge 80 is press-fitted into the bore compensates for the different rates of thermal expansion between the plastic inner sleeve and the non-plastic outer portion, thereby preventing the plastic inner sleeve 53 from slipping or otherwise separating from the non-plastic outer portion 63 when temperature changes in the disk drive. The flats 52 also provide reduced contact with the pivot cartridge 80 so that the plastic inner sleeve 53 can expand into air gaps between the flats 52 rather than transmit stresses to the pivot cartridge 80 and non-plastic outer portion 63. Preferably, eight flats 52 and eight arcs 62 are used (FIG. 4); of the eight flats, four of them align with corresponding splines and recesses.

FIG. 3 shows the construction of a unitary "E-block" 61 used in the preferred HSA 20. The E-block 61 is preferred because it is an integral assembly comprising the non-plastic outer portion 63 and a plurality of actuator arms 60. The integral aspect of the E-block 61 minimizes thermal relaxation issues relative to the "hybrid" HSA. The E-block 61 is typically machined from a single piece of a rigid, lightweight metal such as aluminum. Metals are desirable for their conductive grounding characteristics, but other rigid, lightweight materials could be used, however, such as ceramic. Ports 65, separated by an intermediate member 68, are positioned between an upper E-block ring 66 and a lower E-block ring 67.

Suitably, the plastic inner sleeve and a plastic overmold 52 of the coil portion 50 are formed at the same time. This is done by placing a coil 55 (FIG. 2), wrapped around a coil bobbin 56 (FIG. 2), and E-block 61 in a mold and injecting a suitable plastic, such as forty percent glass filled polyphenylene sulfide ("PPS"), into ports 65 to form an integral plastic inner sleeve 53 and plastic overmold 52. As a result, plastic inner sleeve 53 and plastic overmold 52 are connected via the molding ports. The interface between the E-block rings 66 and 67 and the integral plastic connection in the molding ports effectively prevents the plastic inner sleeve 53 from moving longitudinally relative to the outer portion 63 of the E-block.

Figure 4:
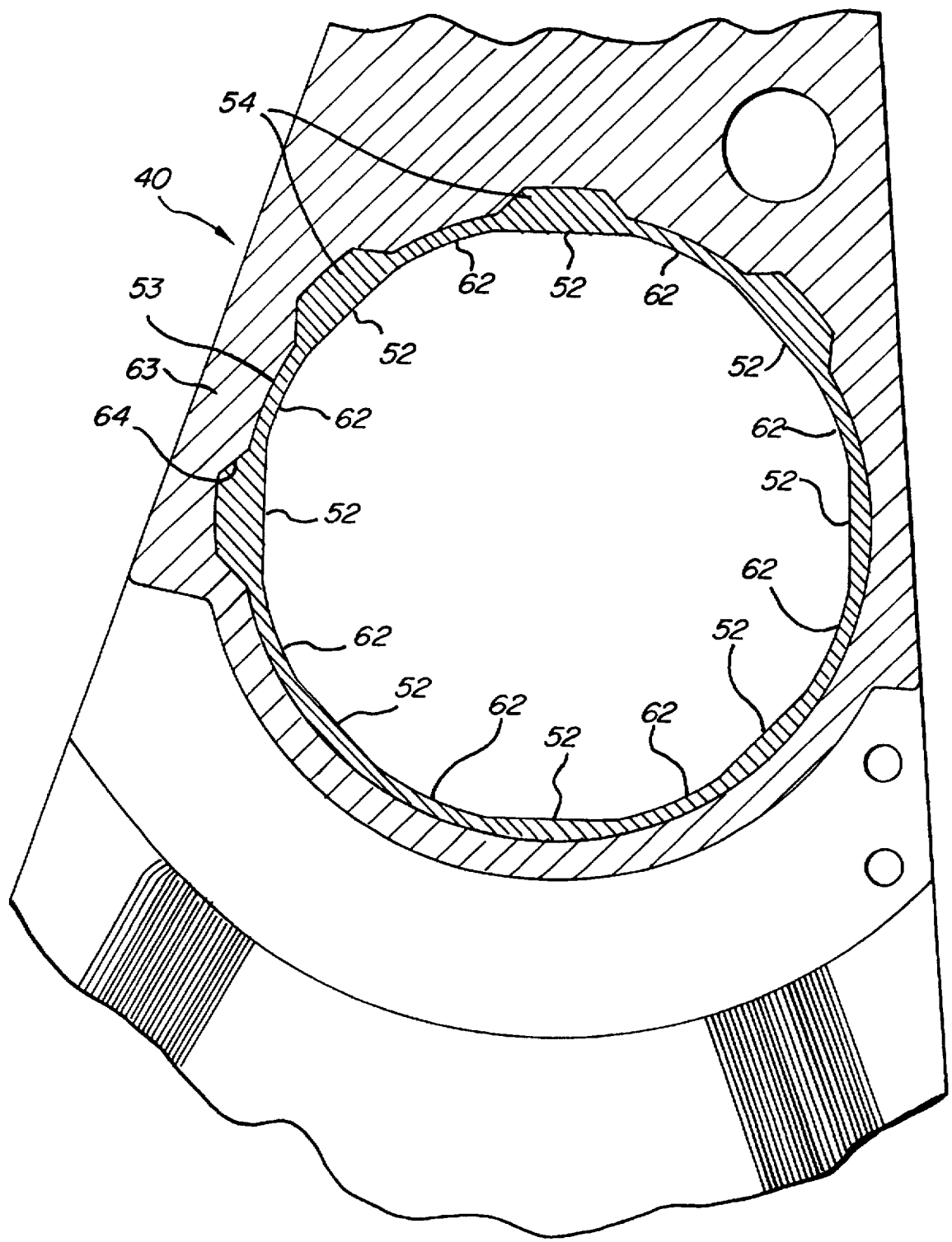
FIG. 4 is a top plan view of a central portion of the head stack assembly of FIG. 2 showing the engagement between the splines and recesses of the plastic inner sleeve and the non-plastic outer portion, respectively.

FIG. 4 is a top plan view of the body portion 40 of the HSA 20, showing the construction of the preferred plastic inner sleeve 53 and its interface with the non-plastic outer portion 63. As shown, the preferred inner sleeve 53 has eight, uniformly distributed flats 52 that are separated by circumferentially positioned arcs 62. Four of the flats 52 are aligned with the four splines 54 and corresponding recesses 64. It is possible, of course, to use more or less than eight flats 52 and to make the flats 52 sufficiently wide such that they connect with one another without intermediate arcs 62. While the plastic inner sleeve 53 is preferably circumferentially continuous, the plastic inner sleeve may also be circumferentially discontinuous which can be formed by including a gap along the entire length of each arc 62, i.e., in the gap, plastic would not exist between the inserted pivot bearing cartridge and the outer portion of the body portion.

Significantly, this invention allows a metal pivot bearing cartridge to be press-fitted into the bore of an HSA having a body portion which includes a non-plastic outer portion, such as a metal outer portion. The press-fit is achieved by including a plastic inner sleeve within the body portion. By press-fitting the pivot bearing cartridge into the bore, the assembly time and the costs of manufacturing are reduced compared to using a side pull screw method. Also, the plastic inner sleeve allows the use of a unitary E-block, such as E-block 61, which ensures consistent grounding of the actuator arms and the actuator arms do not move radially relative to one another due to significant temperature changes as in the Hybrid HSA.

I claim:

1. A head stack assembly for a disk drive, the head stack assembly comprising:
   a body portion, the body portion including:
      a plastic inner sleeve, the plastic inner sleeve including:
         an inner sleeve surface defining a bore having a longitudinal bore axis and including a plurality of circumferentially positioned flats,
         each flat extending in the direction of the longitudinal bore axis; and
      a non-plastic outer portion;
      the plastic inner sleeve and the outer portion defining holding means for holding in place the plastic sleeve, the holding means including:
         means for preventing relative angular motion between the plastic inner sleeve and the outer portion;
   an actuator arm cantilevered from the body portion; and
   a coil portion cantilevered from the body portion in an opposite direction from the actuator arm.

2. The head stack assembly of claim 1 wherein the holding means further comprises means for preventing relative longitudinal motion between the plastic inner sleeve and the outer portion.

3. The head stack assembly of claim 2 wherein the means for preventing relative longitudinal motion between the plastic inner sleeve and the outer portion comprises a molding port in the outer portion.

4. The head stack assembly of claim 3 wherein the coil portion includes a plastic overmold that is integrally formed with the plastic inner sleeve, and wherein the plastic overmold and the plastic inner sleeve are connected via the molding port.

5. The head stack assembly of claim 1 wherein the means for preventing relative angular motion between the plastic inner sleeve and the outer portion comprises a spline and a recess, the spline formed in one of the plastic inner sleeve and the outer portion and the recess formed in the other of the plastic inner sleeve and the outer portion.

6. The head stack assembly of claim 5 wherein the spline is formed in the plastic inner sleeve and wherein the recess is formed in the outer portion.

7. The head stack assembly of claim 5 wherein a circumferentially positioned flat is aligned with the spline and the recess.

8. The head stack assembly of claim 5 wherein the means for preventing relative angular motion comprises a plurality of splines and a corresponding plurality of recesses.

9. The head stack assembly of claim 8 wherein the means for preventing relative angular motion comprises four splines and four recesses.

10. The head stack assembly of claim 9 wherein the plurality of circumferentially positioned flats includes four circumferentially positioned flats which are respectively aligned with the four splines and the four recesses.

11. The head stack assembly of claim 1 wherein the plurality of circumferentially positioned flats are separated from one another by circumferentially positioned arcs.

12. The head stack assembly of claim 11 wherein the plastic inner sleeve includes eight circumferentially positioned flats and eight circumferentially positioned arcs.

13. The head stack assembly of claim 1 wherein a respective circumferentially positioned flat extends along the entire length of the inner sleeve surface.

14. The head stack assembly of claim 1 wherein the outer portion and the actuator arm are integral.

15. The head stack assembly of claim 14 wherein the outer portion and the actuator arm are provided as an E-block.

16. The head stack assembly of claim 1 wherein the plastic inner sleeve is circumferentially continuous.

17. A disk drive comprising:
   a base;
   a cover attached to the base;
   a spindle motor attached to the base;
   a disk mounted on the spindle motor;
   a head stack assembly comprising:
      a body portion, the body portion including:
         a plastic inner sleeve, the plastic inner sleeve including:
            an inner sleeve surface defining a bore having a longitudinal bore axis and including a plurality of circumferentially positioned flats, each flat extending in the direction of the longitudinal bore axis; and a non-plastic outer portion; the plastic inner sleeve and the outer portion defining holding means for holding in place the plastic sleeve, the holding means including:
 means for preventing relative angular motion between the plastic inner sleeve and the outer portion;

an actuator arm cantilevered from the body portion; a coil portion cantilevered from the body portion in an opposite direction from the actuator arm; and a pivot bearing cartridge having an outer surface and a shaft, the shaft having an attachment portion for connecting the shaft to the base, wherein the plastic inner sleeve of the head stack assembly surrounds the pivot bearing cartridge.

18. The disk drive of claim 17 wherein the holding means further comprises means for preventing relative longitudinal motion between the plastic inner sleeve and the outer portion.

19. The disk drive of claim 18 wherein the means for preventing relative longitudinal motion between the plastic inner sleeve and the outer portion comprises a molding port in the outer portion.

20. The disk drive of claim 19 wherein the coil portion includes a plastic overmold that is integrally formed with the plastic inner sleeve, and wherein the plastic overmold and the plastic inner sleeve are connected via the molding port.

21. The disk drive of claim 17 wherein the means for preventing relative angular motion between the plastic inner sleeve and the outer portion comprises a spline and a recess, the spline formed in one of the plastic inner sleeve and the outer portion and the recess formed in the other of the plastic inner sleeve and the outer portion.

22. The disk drive of claim 21 wherein the spline is formed in the plastic inner sleeve and wherein the recess is formed in the outer portion.

23. The disk drive of claim 21 wherein a circumferentially positioned flat is aligned with the spline and the recess.

24. The disk drive of claim 21 wherein the means for preventing relative angular motion comprises a plurality of splines and a corresponding plurality of recesses.

25. The disk drive of claim 24 wherein the means for preventing relative angular motion comprises four splines and four recesses.

26. The disk drive of claim 25 wherein the plurality of circumferentially positioned flats includes four circumferentially positioned flats which are respectively aligned with the four splines and the four recesses.

27. The disk drive of claim 17 wherein the plurality of circumferentially positioned flats are separated from one another by circumferentially positioned arcs.

28. The disk drive of claim 27 wherein the plastic inner sleeve includes eight circumferentially positioned flats and eight circumferentially positioned arcs.

29. The disk drive of claim 17 wherein a respective circumferentially positioned flat extends along the entire length of the inner sleeve surface.

30. The disk drive of claim 17 wherein the outer portion and the actuator arm are integral.

31. The disk drive of claim 30 wherein the outer portion and the actuator arm are provided as an E-block.

32. The disk drive of claim 17 wherein the plastic inner sleeve is circumferentially continuous.

33. The disk drive of claim 17 wherein each flat contacts a respective portion of the outer surface of the pivot bearing cartridge.

* * * * *